United States Patent
Liu et al.

(10) Patent No.: US 10,353,160 B1
(45) Date of Patent: Jul. 16, 2019

(54) OPTICAL CONNECTION APPARATUS AND ASSEMBLIES

(71) Applicant: AFL Telecommunications LLC, Duncan, SC (US)

(72) Inventors: Bin Liu, Chestnut Hill, MA (US); Magdy Sadek, Nashua, NH (US); Scott Prescott, Belmont, NH (US); Xiujiang Huang, Westford, MA (US); Dane Krampitz, Groton, MA (US)

(73) Assignee: AFL Telecommunications LLC, Duncan, SC (US)

( * ) Notice: Subject to any disclaimer, the term of this patent is extended or adjusted under 35 U.S.C. 154(b) by 1 day.

(21) Appl. No.: 16/007,452

(22) Filed: Jun. 13, 2018

(51) Int. Cl.
*G02B 6/42* (2006.01)
*G02B 6/32* (2006.01)

(52) U.S. Cl.
CPC ......... *G02B 6/4292* (2013.01); *G02B 6/4206* (2013.01); *G02B 6/4215* (2013.01); *G02B 6/4286* (2013.01); *G02B 6/32* (2013.01); *G02B 6/4208* (2013.01); *G02B 6/4249* (2013.01)

(58) Field of Classification Search
None
See application file for complete search history.

(56) References Cited

U.S. PATENT DOCUMENTS 4,307,934 A * 12/1981 Palmer ................. G02B 6/4204
250/227.24

\* cited by examiner

*Primary Examiner* — Jerry Rahill
(74) *Attorney, Agent, or Firm* — Dority & Manning, P.A.

(57) ABSTRACT

An optical connection apparatus for a fiber optic connector is provided. The fiber optic connector has at least one optical fiber extending therethrough and terminating at a fiber end. The apparatus includes a photodetector, the photodetector including a photosensitive area having a first width along a first axis. The apparatus further includes an optical converging lens spaced from the photosensitive area along a second axis perpendicular to the first axis, the lens including an aperture having a second width along the first axis. A first distance is defined along the second axis between the photosensitive area and the lens. The apparatus further includes a body defining a slot for insertion of the fiber optic connector. A second distance is defined from the lens, the second distance opposite the first distance relative to the lens.

19 Claims, 3 Drawing Sheets

US 10,353,160 B1

OPTICAL CONNECTION APPARATUS AND ASSEMBLIES

FIELD

The present disclosure relates generally to optical connection apparatus and assemblies for fiber optic connectors, such as for connecting the fiber optic connectors to optical power meters for loss testing and other applications.

BACKGROUND

Light source power meter methods are generally known and utilized in the fiber optics industry to measure the insertion losses of the optical fibers in fiber optic cables. Typically, a fiber optic cable under test may be connected between two test cables. One test cable is connected to a light source, and the other test cable is connected to an optical power meter. Light is transmitted from the light source through the test cables and fiber optic cable to the power meter, and the loss in an optical fiber of the fiber optic cable is determined based on the measured power at the power meter and the power measured by referencing the light source to the power meter directly.

International standards require loss testing for both cable installation and maintenance, particularly in the case of use of multi-fiber connectors such as multi-fiber push-on ("MPO") connectors. Typically, the connector is connected to a power meter for such testing. In some cases, the power meter is equipped with a large area photodetector. In other cases, the power meter has a fiber array which mates with the connector. In the case of MPO connectors utilizing the former case, light from the MPO fibers is directed on the photodetector through free space. However, the gap between the end face of the connector and the detector must be small enough to capture all light. Therefore, a pinned (male) MPO connector cannot be connected to such a power meter and measured. For the later case, lights from the MPO connector are guided through the contacted array, e.g., a mated MPO cable, and transmitted to the photodetector. However, due to manufacturing imperfections, mechanical misalignment errors, and other reasons, the insertion loss between the MPO connector and such a waveguided interface may significantly vary between fibers, and even between each connecting action. Therefore, these insertion loss errors could hinder a precise optical power measurement and compromise subsequent loss measurement accuracy.

Accordingly, improved optical connection apparatus and assemblies for fiber optic connectors is desired in the art. In particular, optical connection apparatus and assemblies which facilitate accurate loss testing and address the above-stated issues would be advantageous.

BRIEF DESCRIPTION

Aspects and advantages of the invention will be set forth in part in the following description, or may be obvious from the description, or may be learned through practice of the invention.

In accordance with one embodiment, an optical connection apparatus for a fiber optic connector is provided. The fiber optic connector has at least one optical fiber extending therethrough and terminating at a fiber end. The apparatus includes a photodetector, the photodetector including a photosensitive area having a first width along a first axis. The apparatus further includes an optical converging lens spaced from the photosensitive area along a second axis perpendicular to the first axis, the lens including an aperture having a second width along the first axis. A first distance is defined along the second axis between the photosensitive area and the lens. The apparatus further includes a body defining a slot for insertion of the fiber optic connector. A second distance is defined along the second axis from the lens, the second distance opposite the first distance relative to the lens.

In accordance with another embodiment, an optical connection assembly for a fiber optic connector is provided. The fiber optic connector has at least one optical fiber extending therethrough and terminating at a fiber end. The assembly includes an optical power meter and an optical connection apparatus connected to the optical power meter. The optical connection apparatus includes a photodetector, the photodetector including a photosensitive area having a first width along a first axis. The apparatus further includes an optical converging lens spaced from the photosensitive area along a second axis perpendicular to the first axis, the lens including an aperture having a second width along the first axis. A first distance is defined along the second axis between the photosensitive area and the lens. The apparatus further includes a body defining a slot for insertion of the fiber optic connector. A second distance is defined along the second axis from the lens, the second distance opposite the first distance relative to the lens.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION

A full and enabling disclosure of the present invention, including the best mode thereof, directed to one of ordinary skill in the art, is set forth in the specification, which makes reference to the appended figures, in which.

DETAILED DESCRIPTION

Figure 1:
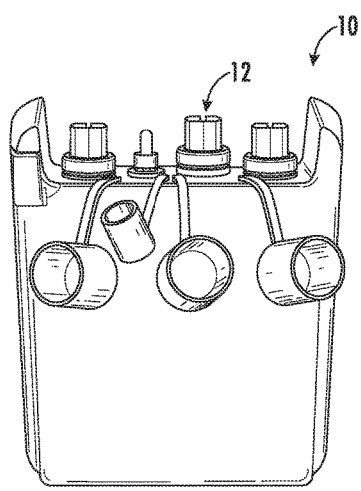
FIG. 1 is a perspective view of an optical connection assembly in accordance with embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, terms of approximation, such as "generally", "about", or "approximately", include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Referring now to FIG. 1, one embodiment of an optical power meter 10 is illustrated. The optical power meter 10 measures the power in an optical signal, as is generally understood. The optical signal can be provided to the optical power meter 10 via a fiber optic cable which includes one or more optical fibers and a connector. The optical signal can be transmitted through the optical fibers of the fiber optic cable from, for example, a light source. The optical signal can then travel through the connector which is connected to the optical power meter 10, such that the optical signal is provided to the optical power meter 10 for measurement.

As discussed, there are known issues with the connection of fiber optic cables to optical power meters 10 which can prevent the connection of certain types of connectors and which can cause undesirable insertion loss errors. Accordingly, improved optical connection apparatus 12 are provided in accordance with the present disclosure. Such optical connection apparatus 12 can, for example, be connected to a power meter 10 (such as a separate component or as a component part of the optical power meter 10). Optical connection apparatus 12 in accordance with the present disclosure advantageously reduce or eliminate insertion losses. Further, optical connection apparatus 12 in accordance with the present disclosure can be utilized with a large variety of connector types, including male and female multiple fiber connectors (such as MPO-style connectors), duplex connectors, simplex connectors, and ferrules. Still further, because of the design of apparatus 12 in accordance with the present disclosure and the inventive spatial relationships between the various components thereof as discussed herein, relatively smaller-sized components such as photodetectors can be utilized to obtain the desired test results and power readings.

Figure 2:
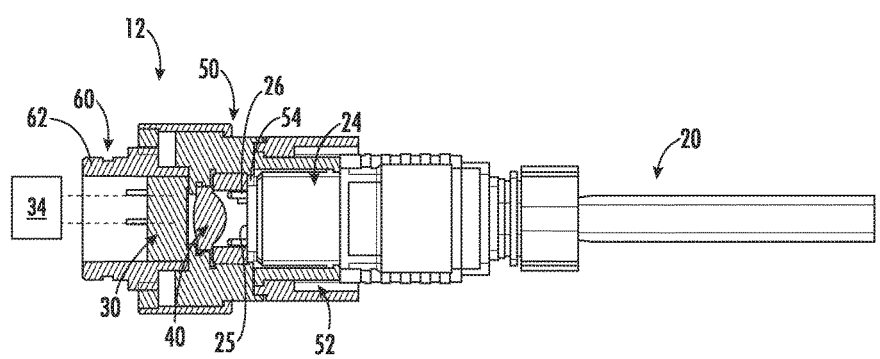
FIG. 2 is a side cross-sectional view of an optical connection apparatus with a fiber optic connector of a fiber optic cable inserted therein in accordance with embodiments of the present disclosure.
Figure 3:
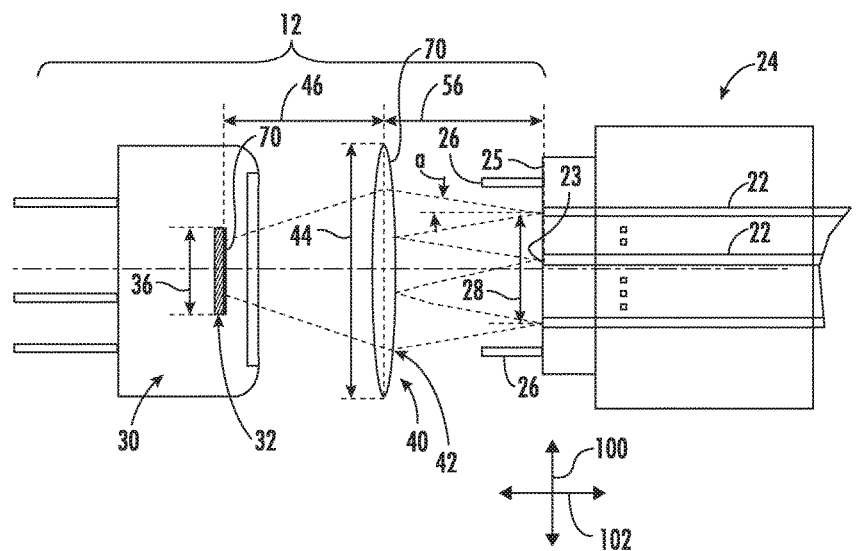
FIG. 3 is a schematic illustration of an optical connection apparatus and fiber optic connector in accordance with embodiments of the present disclosure.
Figure 4:
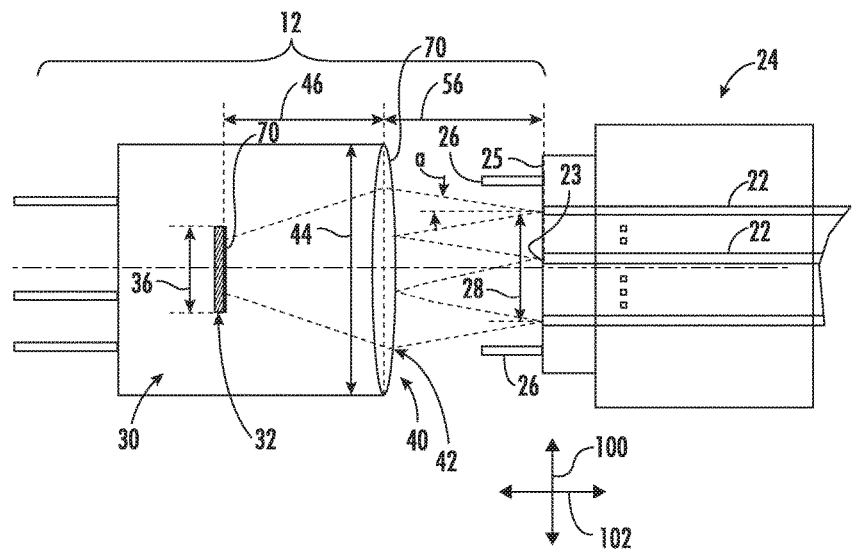
FIG. 4 is a schematic illustration of an optical connection apparatus and fiber optic connector in accordance with other embodiments of the present disclosure.
Figure 5:
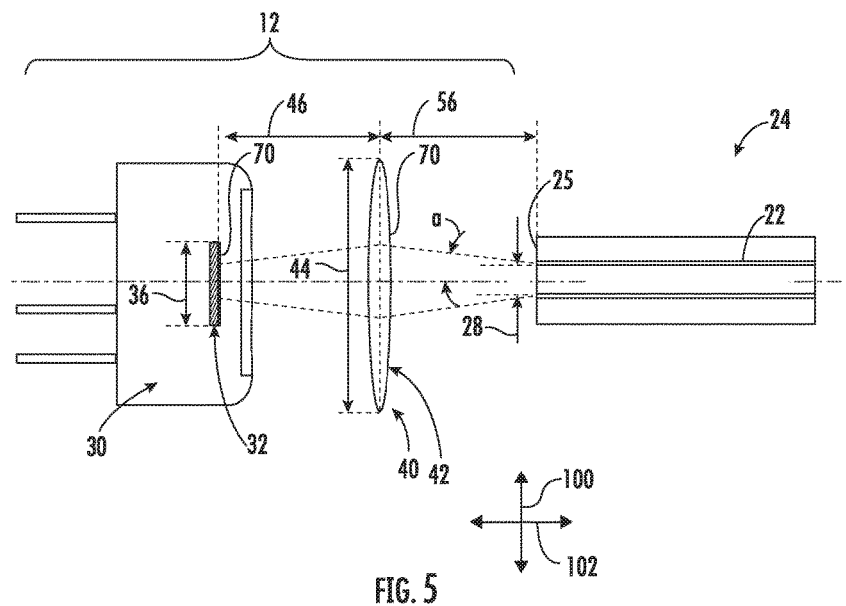
FIG. 5 is a schematic illustration of an optical connection apparatus and fiber optic connector in accordance with still other embodiments of the present disclosure.
Figure 6:
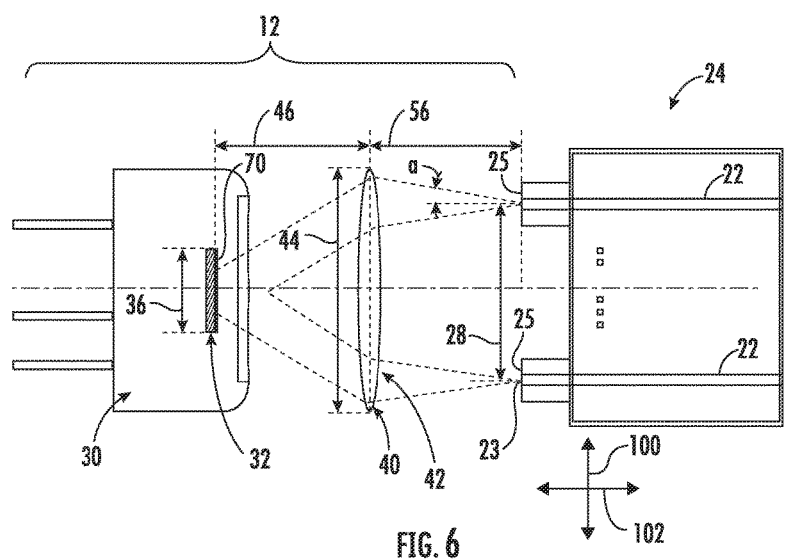
FIG. 6 is a schematic illustration of an optical connection apparatus and fiber optic connector in accordance with yet other embodiments of the present disclosure.

Referring now to FIGS. 2-6, embodiments of optical connection apparatus 12 in accordance with the present disclosure are provided. The optical connection apparatus 12 may accommodate therein a connector 24 of a fiber optic cable 20 which includes one or more optical fibers 22 and the connector 24. For example, FIGS. 2-4 illustrate a multi-fiber connector 24. FIG. 5 illustrates a simplex connector 24. FIG. 6 illustrates a duplex connector 24. In each case, one or more optical fibers 22 extend through the connector 24 and terminates at a fiber end 23. Such termination of the fiber end 23 may, for example, occur at an end face 25 of the connector 24. In some embodiments, such as in the embodiments illustrated in FIGS. 2-4, the connector 24 may further include one or more pins 26 or other protrusions extending from the end face 25. Advantageously such pins 26 or other protrusions can be accommodated by optical connection apparatus 12 while maintaining reduced or eliminated insertion losses.

As shown, apparatus 12 may include a photodetector 30. The photodetector 30 may include a photosensitive area 32 which detects light provided thereto. As is generally understood, the photodetector (and photosensitive area 32 thereof) may convert the received light to electrical signals. These electrical signals may then be communicated to measurement devices 34 which measure the intensity (for example, one or more of current, voltage, etc., which may correspond to optical power) of the electrical signals, which corresponds to the optical power of the light. Accordingly, such measurement devices 34 measure the optical signal(s) (i.e. the power thereof) from the associated photodetectors. A measurement device 34 may, for example, be disposed in an optical power meter 10 to which the apparatus 12 is connected, such that the photodetector 30 and measurement device 34 are connected.

As shown, the photosensitive area 32 may have a first width 36 (i.e. a maximum width or diameter) along a first axis 100. This width 36 may be a width at the face of the photosensitive area 32 which receives the light.

Apparatus 12 may further include an optical converging lens 40. The lens 40 may, for example, be a plano-convex, convex, or aspheric lens. Lens 40 may be spaced from the photosensitive area 32 and the photodetector 30 generally, such as along a second axis 102 which is perpendicular to the first axis 100. A first distance 46 may defined between the photosensitive area 32 and the lens 40 (i.e. a centerpoint of the lens as shown), such as along the second axis 102.

Lens 40 may include or define an aperture 42, which is generally the area of the lens through which light passes. As shown, the aperture 42 may have a second width 44 (i.e. a maximum width or diameter) along the first axis 100.

Apparatus 12 may further include a body 50 which defines a slot 52 (i.e. an adapter slot) for insertion of a fiber optic connector 24. The slot 52 may be sized to accommodate a specific connector 24 design, such as a ferrule, simplex, duplex, or multiple fiber connector. To utilize the apparatus 12, a connector 24 may be inserted into the slot 52. A stop surface 54 may be defined in the body 50 or externally on the body 50, or at another suitable location. In some embodiments, for example, stop surface 54 may define or be disposed within the slot 52. When the connector 24 is inserted into the slot 52, the stop surface 54 may contact the inserted connector 24, such as the end face 25 thereof, and thus position the connector 24 accurately relative to other apparatus 12 components such as the lens 40 and photodetector 30. Alternatively, the stop surface 54 may contact another portion of the inserted connector 24 other than the end face 25 to position the connector 24 accurately relative to other apparatus 12 components such as the lens 40 and photodetector 30.

A second distance 56 may be defined from the lens 40 (i.e. a centerpoint of the lens as shown), such as along the second axis 102. In some embodiments, the second distance 56 may be defined between the stop surface 54 and the lens 40. The second distance 56 may be opposite the first distance 46 relative to the lens 40. Accordingly, the first and second distances 46, 56 may extends in opposite directions from the lens 40 along the second axis 102. When the connector 24 is inserted, the second distance 56 may be defined between the lens 40 and the end face 25.

Apparatus 12 may further include a base housing 60. The base housing 60 may include a mount portion 62 which interfaces with the optical power meter 10 to connect the apparatus 12 to the optical power meter 10. For example, the mount portion 62 may include inner or outer threads, or a groove or other suitable fitting, which mates with an opposing component on the optical power meter 10. This mating may connect the apparatus 12 to the optical power meter 10. In some embodiments, as shown, the photodetector 30 may be disposed within the base housing 60. Alternatively, the photodetector 30 may be disposed within the optical power meter 10.

Further, the lens 40 in some embodiments may be disposed in the body 50. Alternatively, the lens 40 may be disposed in the base housing 60. The base housing 60 and the body 50 may be connected together to generally form an outer periphery of the apparatus 12.

In some embodiments, as illustrated in FIG. 4, the lens 40 may be disposed within the photodetector 30. Alternatively, as illustrated in FIGS. 2, 3, 5, and 6, the lens 40 may be separate from the photodetector 30.

In exemplary embodiments, particularly inventive spatial relationships may be defined between the various components of the apparatus 12. Such relationships may facilitate the reduction or elimination of insertion losses, and may further provide such reduction or elimination using advantageously small, cost effective components.

For example, in exemplary embodiments, the first distance 46 and the second distance 56 are approximately equal. In some embodiments, the first distance 46 and second distance 56 may each be less than or equal to 4 millimeters, such as less than or equal to 3.6 millimeters, such as less than or equal to 3.4 millimeters, such as less than or equal to 3.2 millimeters, such as less than or equal to 3 millimeters. Further, in exemplary embodiments, the first distance 46 and/or second distance 56 are each approximately equal to the focal length of the lens 40.

In some embodiments, a minimum value for the first width 36 may be approximately equal or equal to 2 times the first distance 46 times a numerical aperture of the one or more optical fibers 22. This equation may, for example, be expressed as follows:

$$w_{min} \approx 2 \times d \times NA$$

wherein $w_{min}$ is the minimum value for the first width 36, d is the second distance 56, and NA is the numerical aperture. When a single optical fiber 22 is utilized, the numerical aperture may be the numerical aperture of that single optical fiber 22. When multiple optical fibers 22 are utilized, the numerical aperture may be an average numerical aperture for all of the optical fibers 22, or the greatest numerical aperture of all of the optical fibers 22. As is generally understood, the numerical aperture is calculated as follows:

$$NA = \sin(a)$$

wherein NA is the numerical aperture and a is the half-angle of the cone of acceptance for the core of the optical fiber.

By utilizing this minimum value for the first width 36, maximum light collection efficiency can be provided while maintaining a minimum photodetector 30 and photosensitive area 32 size.

In some embodiments, a minimum value for the second width 44 may be approximately equal or equal to a third width 28 (i.e. a maximum width or diameter) of the one or more optical fibers 22 along the first axis 100 plus 2 times the second distance 56 times the numerical aperture of the one or more optical fibers 22. This equation may, for example, be expressed as follows:

$$W_{min} \approx w_{fiber} + 2 \times d \times NA$$

wherein $W_{min}$ is the minimum value for the second width 44, $w_{fiber}$ is the third width 28, d is the second distance 56, and NA is the numerical aperture. When a single optical fiber 22 is utilized, the third width 28 may be a width of the core of the optical fiber 22. When multiple optical fibers 22 are utilized, the third width 28 may be an on-center width of the array of optical fibers 22, i.e. between the centers of the outermost optical fibers 22 of the plurality of optical fibers 22. In some embodiments, such as wherein multiple-fiber connectors 24 are utilized, the third width 28 may be less than or equal to 3.2 millimeters, such as less than or equal to 3.0 millimeters, such as less than or equal to 2.8 millimeters.

By utilizing this minimum value for the second width 44, maximum light collection efficiency can be provided by utilizing a sufficiently large lens which ensures the capture of substantially all light exiting the optical fibers 22.

In some embodiments, a maximum value for each of the first distance 46 and second distance 56 is approximately equal or equal to the first width 36 divided by the numerical aperture divided by 2. This equation may, for example, be expressed as follows:

$$d_{max} \approx w/NA/2$$

wherein $d_{max}$ is the maximum value for the first distance 46 or the second distance 56, w is the first width 36, and NA is the numerical aperture.

By utilizing this maximum value for the first and second distances 46, 56, the focal lengths may be limited to ensure maximum light collection efficiency.

In some embodiments, a film coating 70 may be applied to one or both of the photodetector 30 (such as the optical window thereof) and/or the lens 40.

In some embodiments, such film coating 70 may be an anti-reflection film which may improve light transmittance and power measurement uniformity during use of the apparatus 12. An anti-reflection film may, for example, have a variety of spectral ranges, such as approximately 780-1650 nanometers (such as for InGaAs photodetectors), approximately 700-1600 nanometers (such as for Germanium photodetectors), such as approximately 400-1000 nanometers (such as for Silicon photodetectors).

In other embodiments, such film coating 70 may be a wavelength selective film which may filter out certain undesirable light wavelengths while transmitting therethrough specific, desired, narrow wavelength ranges. A wavelength selective film may, for example, have a spectral range of a suitable wavelength-division-multiplexing (WDM) filter, such as approximately 1301-1321 nanometers, such as approximately 1541-1561 nanometers.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An optical connection apparatus for a fiber optic connector, the fiber optic connector having at least one optical fiber extending therethrough and terminating at a fiber end, the apparatus comprising:
   a photodetector, the photodetector comprising a photosensitive area having a first width along a first axis;

an optical converging lens spaced from the photosensitive area along a second axis perpendicular to the first axis, the lens comprising an aperture having a second width along the first axis, wherein a first distance is defined along the second axis from the photosensitive area to the lens; and a body defining a slot for insertion of the fiber optic connector and a stop surface configured to contact an end face of the fiber optic connector when the fiber optic connector is inserted into the slot, wherein a second distance is defined from the lens to the stop surface, the second distance approximately equal to the first distance and opposite the first distance relative to the lens.

2. The apparatus of claim 1, wherein a minimum value for the first width is approximately equal to 2 times the first distance times a numerical aperture of the optical fiber.

3. The apparatus of claim 1, wherein a minimum value for the second width is approximately equal to a third width of the optical fiber along the first axis plus 2 times the first distance times a numerical aperture of the optical fiber.

4. The apparatus of claim 1, wherein the first distance and the second distance are each approximately equal to a focal length of the lens.

5. The apparatus of claim 1, wherein a maximum value for each of the first distance and the second distance is approximately equal to the first width divided by a numerical aperture of the optical fiber divided by 2.

6. The apparatus of claim 1, further comprising a film coating applied to at least one of the photodetector or the lens.

7. The apparatus of claim 6, wherein the film is an anti-reflection film.

8. The apparatus of claim 6, wherein the film is a wavelength selective film.

9. The apparatus of claim 1, further comprising a base housing, and wherein the photodetector is disposed in the base housing.

10. The apparatus of claim 1, wherein the lens is disposed in the body.

11. The apparatus of claim 1, wherein the lens is disposed within the photodetector.

12. The apparatus of claim 1, wherein the optical fiber is a plurality of optical fibers.

13. The apparatus of claim 12, wherein the fiber optical connector is an MPO-style connector.

14. An optical connection assembly for a fiber optic connector, the fiber optic connector having at least one optical fiber extending therethrough and terminating at a fiber end, the assembly comprising:

an optical power meter; and an optical connection apparatus connected to the optical power meter, the optical connection apparatus comprising:

a photodetector, the photodetector comprising a photosensitive area having a first width along a first axis;

an optical converging lens spaced from the photosensitive area along a second axis perpendicular to the first axis, the lens comprising an aperture having a second width along the first axis, wherein a first distance is defined along the second axis from the photosensitive area to the lens; and a body defining a slot for insertion of the fiber optic connector and a stop surface configured to contact an end face of the fiber optic connector when the fiber optic connector is inserted into the slot, wherein a second distance is defined from the lens to the stop surface, the second distance approximately equal to the first direction and opposite the first distance relative to the lens.

15. The assembly of claim 14, wherein a minimum value for the first width is approximately equal to 2 times the first distance times a numerical aperture of the optical fiber.

16. The assembly of claim 14, wherein a minimum value for the second width is approximately equal to a third width of the optical fiber along the first axis plus 2 times the first distance times a numerical aperture of the optical fiber.

17. The assembly of claim 14, wherein the first distance and the second distance are each approximately equal to the focal length of the lens.

18. The assembly of claim 14, wherein a maximum value for each of the first distance and the second distance is approximately equal to the first width divided by a numerical aperture of the optical fiber divided by 2.

19. The assembly of claim 14, further comprising a film coating applied to at least one of the photodetector or the lens.

* * * * *